United States Patent [19]

Schäfer et al.

[11] 3,984,523

[45] Oct. 5, 1976

[54] SELECTIVE ABSORPTION OF CHLORIDE FROM GASES WHICH CONTAIN CHLORINE AND CARBON DIOXIDE

[75] Inventors: Rolf Schäfer, Krefeld-uerdingen; Hans Schifferdecker, Duisburg, both of Germany

[73] Assignee: Bayer Aktiengesellschaft, Leverkusen, Germany

[22] Filed: June 17, 1974

[21] Appl. No.: 480,171

[30] Foreign Application Priority Data

Mar. 20, 1974  Germany............................ 2413358

[52] U.S. Cl................................ 423/240; 423/234; 423/473
[51] Int. Cl.².......................................... B01D 53/34
[58] Field of Search ........... 423/240, 220, 241, 234, 423/473

[56] References Cited
UNITED STATES PATENTS 1,897,725  2/1933  Gaus et al....................... 423/220 X
2,170,108  8/1939  Barton ............................... 423/473

*Primary Examiner*—Earl C. Thomas
*Attorney, Agent, or Firm*—Burgess, Dinklage & Sprung

[57] ABSTRACT

In a process for the dechlorination of gas mixtures containing carbon dioxide and chlorine, wherein in several absorption stages the chlorine is converted with stoichiometric alkali metal hydroxide solution into a carbonate-free alkali metal chloride-alkali metal hypochlorite solution and wherein the required stoichiometric amount of alkali metal hydroxide is introduced countercurrent to the gas stream via the last absorption stage, the improvement which comprises operating the last absorption stage in such a manner that due to free alkali metal hydroxide no alkali metal hydrogen-carbonate is present in said stage.

3 Claims, No Drawings

SELECTIVE ABSORPTION OF CHLORIDE FROM GASES WHICH CONTAIN CHLORINE AND CARBON DIOXIDE

During the production of use of chlorine, gas mixtures may collect which contain chlorine and carbon dioxide, for example when chlorine is liquefied or chemically reacted. The residual gases from a total liquefaction will have approximately the following composition: 5 – 10 % by volume of chlorine, 20 –40 % by volume of carbon dioxide, 10 – 20 % by volume of hydrogen, the rest being composed of nitrogen and oxgen. The carbon dioxide content may be considerably higher than the chlorine content. These residual gases must be freed of chlorine before they are passed off as spent air into the atmosphere.

The destruction of chlorine-containing gases usually proceeds by means of a sodium hydroxide solution with the formation of sodium hypochlorite according to equation 1:

$$Cl_2 + 2\ NaOH \rightarrow NaCl + NaOCl + H_2O \quad (1).$$

The advantage of this reaction is that the resultant hypochlorite solution (known as bleaching liquor) constitutes a product with a multitude of uses so that its production does not entail any waste water problems. The absorption of chlorine in an excess of sodiun hydroxide solution theoretically takes place quantitatively: the equilibrium constant for the equation amounts to approximately $10^{10}$. Commercial bleaching liquors contain a small excess of sodium hydroxide for stabilization. When using carbon dioxide and chlorine-containing gases for the reaction with excess sodium hydroxide solution, not only does a bleaching liquor form but also great quantities of sodium carbonate. Hitherto there has practically been no use for such mixture products.

It is however known from the prior art to carry out absorption in sodium bicarbonate solution, which forms from the sodium hydroxide solution according to equation (2), and to expel the carbon dioxide with the aid of chlorine according to equation (3). The gross equation (4) from partial reactions (2) and (3) is identical with equation (1):

$$2\ NaOH + 2\ CO_2 \rightarrow 2\ NaHCO_3 \quad (2)$$
$$2\ NaHCO_3 + Cl_2 \rightarrow NaCl + NaClO + 2\ CO_2 + H_2O \quad (3)$$

$$2\ NaOH + Cl_2 \rightarrow NaCl + H_2O \quad (4) = (1)$$

The consumption of sodium hydroxide solution is thus not affected by the carbon dioxide content of the gas mixture: it is determined by the amount of chlorine to be absorbed.

However the attainable residual concentration of chlorine in the purified spent gas is influenced because the sodium bicarbonate/hypochlorite mixture already exerts a noticeable chlorine vapor pressure. The thermodynamic calculation gives an equilibrium constant of about 30 corresponding to residual contents of chlorine of about 5 mg/m³ when sodium bicarbonate is used in a large excess. This value cannot be further reduced by carrying out multistage absorption. This was confirmed by the following experiments.

Experiment 1 a:

A packed column was charged with residual gases from a total liquefaction with approximately the composition given hereinabove and sprayed with a NaHCO$_3$ solution having a concentration of 40 g/l. The gas emerging after the treatment contained approximately 5 mg Cl$_2$/m³.

Experiment 1 b:

After carrying out experiment 1 a) the residual gas source was stopped and air only blown through the packed column. The emerging gas was again found to contain 5 mg Cl$_2$/m³. Thus equilibrium from both sides had been attained.

Experiment 1 c:

A partial current was pumped off at the gas outlet of the packed column and conducted through 3 series-connected washing bottles with fritted glass and filled with sodium hydrogen carbonate solution of the concentration given in 1 (a). After this 4-stage absorption, 5 mg Cl$_2$/m³ were likewise found in the emerging gas.

Accordingly it is not possible to achieve a lower chlorine content than about 5 mg Cl$_2$/m³ by washing with sodium bicarbonate, not even by going through several stages. The possibility of achieving a quantitative absorption by employing an excess of liquor is ruled out because large amounts of a non-utilizable sodium carbonate / bleaching liquor mixture result.

Surprisingly, it has now been found that further dechlorination is nevertheless feasible, given certain conditions, which does not involve further consumption of alkali hydroxide for the carbon dioxide nor the inevitable accumulation of non-utilizable bleaching liquor.

The subject matter of the present invention relates to a process for the dechlorination of gas mixtures containing carbon dioxide and chlorine, wherein in several absorption stages the chlorine is converted with stoichiometric alkali metal hydroxide solution into a carbonate-free alkali metal chloride-alkali metal hypochlorite solution and wherein the required stoichiometric amount of alkali metal hydroxide is introduced countercurrent to the gas stream via the last absorption stage: In accordance with the invention the last absorption stage is operated in such a manner that due to free alkali metal hydroxide no alkali metal hydrogen-carbonate is present in said stage, i.e. that the alkali metal hydroxide introduced in said last stage and corresponding to the chlorine load is not completely reacted with the carbon dioxide, present in said gas mixture.

In accordance with the process of the invention it is possible to reduce the amount of chlorine in the emerging carbon dioxide to values below 1 mg of chlorine/m³ of gas.

The dechlorination takes place continuously in a counter-current absorption device with at least two stages, for example in packed columns, bubble cap plate columns or jet scrubbers; the individual stages can have their own separate liquid cycles. In the last absorption stage alkali metal hydroxide, e.g. NaOH, is added in such an amount as will suffice to convert the entire amount of chlorine into the alkali metal chloride-containing alkali metal hypochlorite according to equation (1).

Sodium hydroxide solution is preferably used as the alkali metal hydroxide which is fed into the last absorption stage in the form of a 1 to 25 % by weight aqueous solution. The carbonate-free alkali metal hypochlorite solution resulting from the first absorption stage is continuously discharged from the first absorption stage at a rate which it is formed. The sodium hydroxide supply to enable the stoichiometric formation of alkali metal hypochlorite according to equation (1) can be regulated in a simple manner via the pH value of the alkali metal hypochlorite solution leaving the first absorption stage. The discharged alkali metal hypochlorite should have a pH value between 6 and 8, preferably between 7 and 7.5.

By carrying out the last absorption stage in accordance with the invention so that not all the introduced alkali metal hydroxide is converted to alkali metal carbonate in the last absorption stage, the last absorption is carried out in the presence of a sufficiently large amount of free alkali metal hydroxide with the result that even the small amounts of chlorine of about 5 mg/m$^3$, which are present in the gas entering into the last absorption stage, are substantially all linked in the form of alkali metal hypochlorite.

The size of the last absorption stage which will permit adherence to the conditions of the invention can be easily determined and will be illustraed by an example. The gas to be purified is pre-purified with sodium bicarbonate solution to bring the chlorine content to a low level (approximately 5 mg/m$^3$ of gas) and conducted through an absorption stage, for example a packed column with an excess of sodium hydroxide solution. The load is chosen to be so great that carbon dioxide partially passes through the column right from the start. Under these conditions a maximum carbon dioxide conversion rate is acheived because there is an excess of carbon dioxide and sodium hydroxide throughout the entire column. From the decrease in the concentration of the sodium hydroxide and the known volume of the solution it is possible to calculate the amount of sodium hydroxide which is absolutely consumed by the formation of sodium carbonate. By simply converting the figures to units of volume and time, the maximum possible consumption of sodium hydroxide by the formation of sodium carbonate in kg of sodium hydroxide per m$^3$ of the volume of the packings and per hour is obtained. The chlorine content of the gas to be purified is known and hence the minimum sodium hydroxide consumption. The last stage must be operated according to the invention so that the sodium hydroxide consumption due to intermediary sodium carbonate formation is less than the stoichiometric sodium hydroxide supply corresponding to the chlorine content (in the gas to be purified). An example with figures illustrates the setup for the last absorption stage.

A packed column 200 mm in diameter and 800 mm high (a volume of approximately 25 liters) is loaded with approximately 50 m$^3$/h of a carbon dioxide-containing gas prepurified with sodium bicarbonate solution. 10 liters of liquor with 50 g of NaOH/liter are recycled. After 20minutes the concentration has fallen to 33.4 g of NaOH/liter. The absolute consumption amounts to 166 g of NaOH. Mathematical conversion yields about 20 kg of NaOH/m$^3$ per hour.

At least 6 kg of Cl$_2$/hour and, so as to correspond to equation (1), 6.75 kg of sodium hydroxide should be fed into the column to be provided. The packed column volume of the last stage may therefore only amount to 6.75 kg of NaOH/hour = 0.34m$^3$ 20 kg of NaOH/m$^3$/-hour The process according to the invention will be explained in the following Examples.

EXAMPLE 1

A three-stage packed column with a diameter if 600 mm and a packed layer of 1500 mm for each stage and three separate liquid cycles of 6 m$^3$/hour was operated with residual gases from a total liquefaction and approximately 300 m$^3$/hour of dilution air. The residual gas constituted a gas which collected during the total liquefaction corresponding to a ton of liquid chlorine/hour. It contained approximately5 kg CO$_2$/hour and approximately 3 kg of chlorine/hour. The dilution air only had the effect of rendering the dilute mixture no longer exposive.

Sodium hydroxide solution in the form of a 5 % caustic soda solution was fed into the last absorption stage in an amount required for the stoichiometric conversion into bleaching liquor, the rate of addition of the sodium hydroxide solution being controlled by the pH value of the first stage, theoretical value approximately 7.5. The entire carbon dioxide passed off into the atmosphere. The bleaching liquor formed was removed from the first stage. In the liquid cycle of the last stage only sodium bicarbonate and little sodium carbonate were detectable; accordingly 5 mg Cl$_2$/m$^3$ passed through together with the carbon dioxide.

EXAMPLE 2

All parameters were as in Example 1, only the load was increased. With a load corresponding to 2 tons of liquid chlorine/hour, approximately 10 kg of carbon dioxide/hour and approximately 6 kg of chlorine/hour were introduced into the 3-stage packed column. Approximately 10 g NaOH/l as well as sodium carbonate were found in the last absorption stage. The chlorine content in the emerging carbon dioxide was less than 1 mg of chlorine/m$^3$.

EXAMPLE 3

The load was further increased corresponding to 8 tons of liquid chlorine/hour. Approximately 40 kg of CO$_2$/hour and approximately 30 kg of Cl$_2$/hour were fed into the packed column. The sodium hydroxide content in the last cycle increased to approximately 40 g NaOH/liter, the chlorine content in the emerging carbon dioxide again amounted to less than 1 mg of chlorine/m$^3$.

We claim:

1. A process for the dechlorination in a plurality of stages of gas mixtures containing carbon dioxide and chlorine, comprising passing said gas mixture successively through said stages from first to last stage, adding alkali metal hydroxide solution to the last stage and advancing said solution successively through said stages from last to first stage, the alkali metal being provided in stoichiometric amount to produce a carbonate-free alkali metal chloride-alkali metal hypochlorite solution, and supplying gas mixture to said first stage and alkali metal hydroxide solution to said last stage in such amounts and rates that no alkali metal hydrogen-carbonate is present in the last stage, whereby the residual chlorine content of the gas leaving the last absorption stage is less than about 1 mg/m$^3$.

2. The process of claim 1, wherein the gas mixture is the by-product of a chlorine liquefaction process.

3. The process of claim 2, wherein the gas mixture contains air in sufficient amount to render the mixture non-explosive.

* * * * *